United States Patent [19]
Danzyger et al.

[11] Patent Number: 6,050,833
[45] Date of Patent: Apr. 18, 2000

[54] GLARE FILTER FOR COMPUTER MONITORS

[75] Inventors: Howard L. Danzyger, Aurora; Michael C. Thuma, Des Plaines; James F. Caruso, Evanston; Ann Marie Conrado; Brian J. Woodard, both of Chicago; Karenann Brow, Elgin, all of Ill.

[73] Assignee: Fellowes Manufacturing Company, Itasca, Ill.

[21] Appl. No.: 08/963,003

[22] Filed: Nov. 3, 1997

[51] Int. Cl.$^7$ ...................................................... H01R 4/66
[52] U.S. Cl. ............................ 439/92; 359/601; 359/603; 248/474; 248/918; 248/201
[58] Field of Search ........................ 439/92, 95; 359/609, 359/601, 603, 608; 248/918, 474, 473, 479, 489, 201

[56] References Cited

U.S. PATENT DOCUMENTS

| | | | |
|---|---|---|---|
| 1,778,728 | 10/1930 | Raskin | 248/474 |
| 3,215,776 | 11/1965 | Hamilton . | |
| 3,564,138 | 2/1971 | Harrold . | |
| 4,427,264 | 1/1984 | Kamerling . | |
| 4,569,572 | 2/1986 | Kopich . | |
| 4,577,928 | 3/1986 | Brown . | |
| 4,619,429 | 10/1986 | Mazza . | |
| 4,759,621 | 7/1988 | Hawkins | 248/474 |
| 4,865,420 | 9/1989 | Schmidt . | |
| 5,004,320 | 4/1991 | Hagai et al. . | |
| 5,048,928 | 9/1991 | Davis . | |
| 5,155,627 | 10/1992 | Keehn et al. . | |
| 5,218,474 | 6/1993 | Kirschner . | |
| 5,227,916 | 7/1993 | Theirl et al. . | |
| 5,404,181 | 4/1995 | Hung | 359/601 |
| 5,668,812 | 9/1997 | Hung . | |
| 5,689,371 | 11/1997 | Butterfield | 359/609 |
| 5,797,570 | 8/1998 | Dolan et al. | 248/918 |
| 5,803,424 | 9/1998 | Keehn et al. | 248/918 |

FOREIGN PATENT DOCUMENTS

| | | |
|---|---|---|
| 2 301 512 | 12/1996 | United Kingdom . |
| WO 93/14596 | 7/1993 | WIPO . |

OTHER PUBLICATIONS

Pages 141 and 142 from Ergonomics In Computerized Offices by Etienne Grandjean (1987).

Pages 49 and 50 from American National Standard for Human Factors Engineering of Visual Display Terminal Workstations (1988).

Two pages from a 1997 Supplement to CTDNews.

Pages 69 through 71 from the 64$^{th}$ Edition, Spring/Summer 1994 Visible Computer Supply Corp. catalog filters for computers.

Pages 90 and 91 from a Quill® Computer Products Catalog showing filters for computers.

Page 148 from Catalog 24, Winter 1994 Office Depot® showing filters for computers.

A product brochure for Anti–Glare Filters marketed by Fellowes® copyrighted 1994 that shows filters believed to have been available prior to the filing date of the present application.

(List continued on next page.)

*Primary Examiner*—Paula Bradley
*Assistant Examiner*—Katrina Davis
*Attorney, Agent, or Firm*—Brinks, Hofer, Gilson & Lione; G. Peter Nichols

[57] ABSTRACT

A glare filter for a computer monitor having a support element with a first side and a second side, and a frame with a first side and a second side. The first side of the frame is pivotably connected to the first side of the support element, and the second side of the frame is pivotably connected to the second side of the support element. The glare filter also has a filter medium secured to the frame and at least one clip for removably attaching the support element to the computer monitor.

17 Claims, 4 Drawing Sheets

OTHER PUBLICATIONS

Pages 98 through 100 from a Feb. 1994 Global® Computer Supplies product catalog showing filters for computers.

Two pages from the 1994 Eastman catalog filters for computers.

Pages 99 and 102 vol. 29 of the Elek–Trek® catalog showing filters for computers believed to have been available prior to the filing date of the present application.

Pages 36 and 37 from a 1994 Varco® catalog showing filters for computers believed to have been available prior to the filing date of the present application.

Page 55 the Winter 1993 Reliable catalog showing filters for computers.

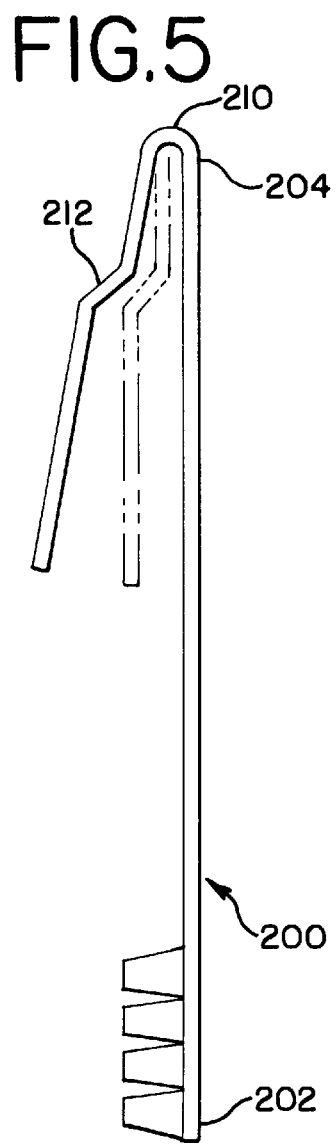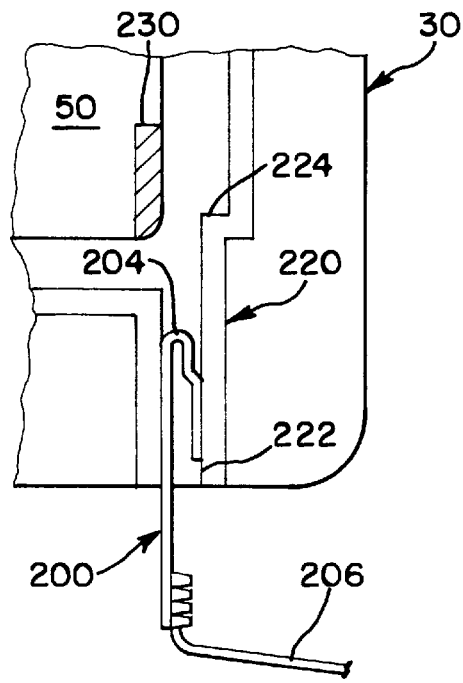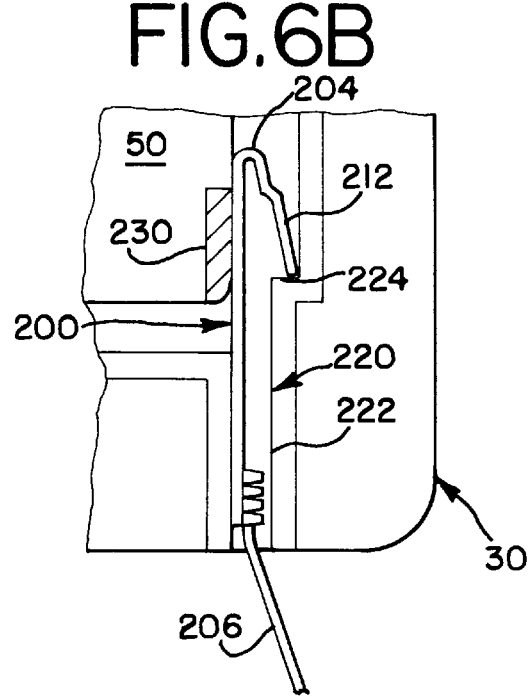

GLARE FILTER FOR COMPUTER MONITORS

BACKGROUND OF THE INVENTION

This invention pertains to the field of glare filters for computer monitors. More specifically, the invention relates to a glare filter for computer monitors that is vertically, horizontally, and pivotably adjustable.

Unfortunately, users of computer monitors are often times using it in an environment where light bulbs or sunlight create glare on the screen and render the characters on the screen difficult to view. To overcome this problem, glare filters are typically attached to the front of the computer monitors screen. The glare filters known in the prior art, however, are typically positioned parallel to the screen and are incapable of being adjusted vertically, horizontally, and/or pivotably. As a result of its inability to rotate, the filter is capable of eliminating only a limited amount of glare from the users sight.

In addition, it is well known in the prior art to position a user's computer monitor between 0 and 50 degrees below the horizontal plane passing through the eyes of the user. Typically, the user accomplishes this orientation by tilting the computer monitor. When the monitor is in this tilted position, however, the amount of glare on the screen is increased. By securing one of the prior art glare filters to the screen in a parallel relationship, the user is able to eliminate only a small amount of the glare on the screen.

Moreover, computer monitors are designed in different sizes, shapes, and with various features that affect the positioning of a glare filter against the screen. As a result, a vertically and horizontally adjustable glare filter is desirable. The glare filters known in the prior art, however, fail to effectively accomplish this adjustability.

Accordingly, it is an object of the present invention to provide a glare filter for computer monitors that is vertically, horizontally, and pivotably adjustable. In the present invention, a glare filter for a computer monitor that is pivotable about a point on its sides and is secured to the computer monitor with clamp that allow vertical and horizontal adjustments is provided. As a result, the glare filter of the present invention is an improvement over the prior art glare filters in that the glare filter of the present invention is vertically, horizontally, and pivotably adjustable.

It is another object of the present invention to provide an improved grounding clip for a glare filter.

SUMMARY OF THE INVENTION

The present invention provides a glare filter for a computer monitor Comprising a support element having a first side, a second side, and a top side, and a frame with a filter medium secured to the frame. The frame has a first side, a second side, a top side, and a bottom side, with the first side of the frame being pivotably connected to the first side of the support element, and the second side of the frame being pivotably connected to the second side of the support element. The glare filter also comprises at least one clip for removably attaching the top side of the support element to the computer monitor.

The present invention also provides a grounding clip for a glare filter having a frame with a slot and a filter medium. The grounding clip comprises an end with a curved portion to allow the grounding clip to be inserted into the slot of the frame, and a stepped portion to allow the grounding clip to be fixedly positioned within the slot of the frame. At least a portion of the end also contacts the filter medium.

BRIEF DESCRIPTION OF THE DRAWINGS

FIG. 5 is a side view of a grounding clip of the present invention.

FIGS. 6A and 6B are partial cut-away views of a frame of the glare filter of the present invention and the grounding clip of FIG. 5.

DETAILED DESCRIPTION OF THE PREFERRED EMBODIMENTS

Figure 1:
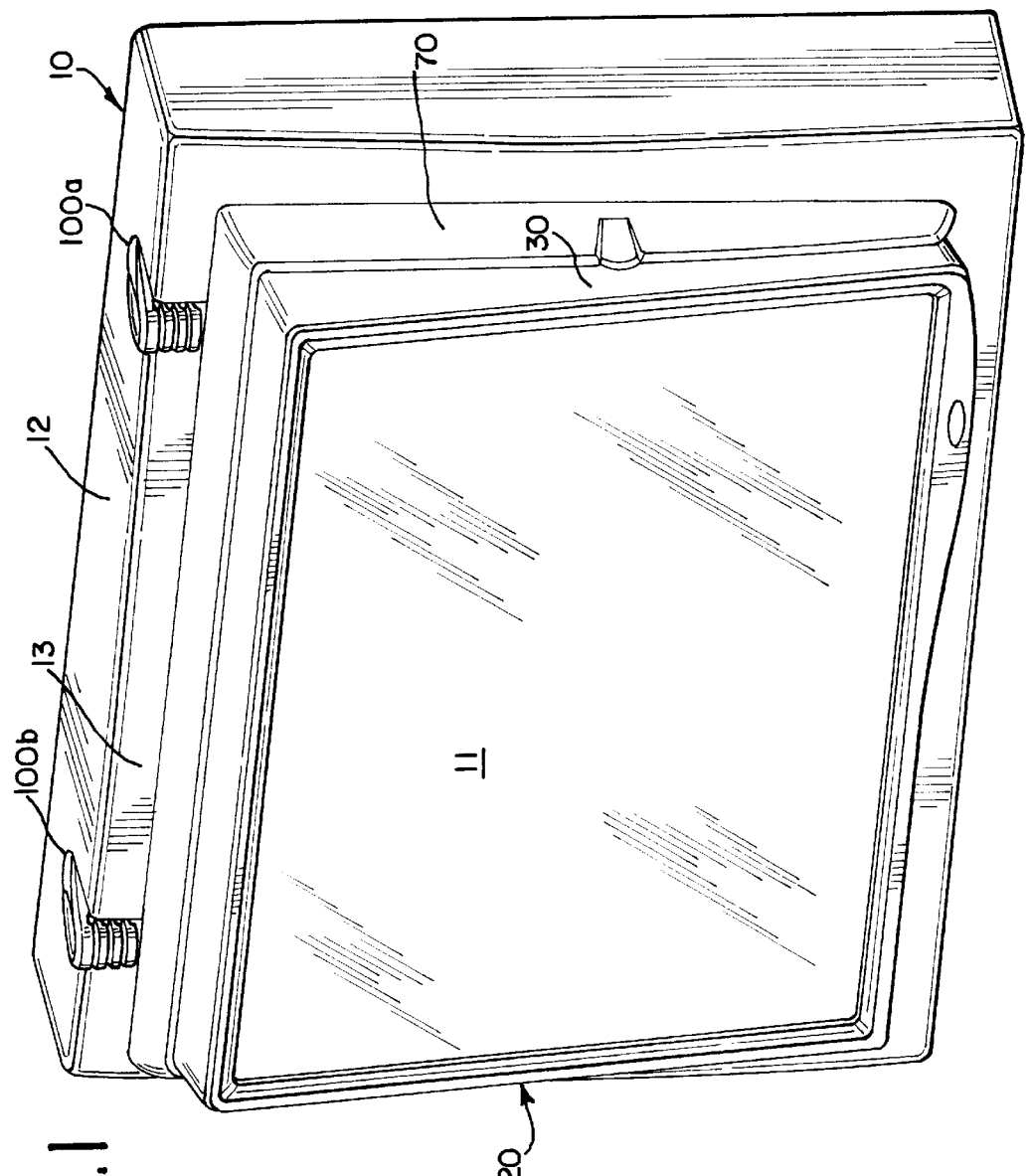
FIG. 1 is a perspective view of the glare filter of the present invention attached to a computer monitor.

Turning now to the drawings, FIG. 1 shows a computer monitor 10 with a glare filter 20 of the present invention. The computer monitor 10 may be any typical computer monitor, and has a screen 11, a top side 12, and a front side 13. Preferably, at least a portion of the top side 12 of the computer monitor is flat, although the top side may have a variety of different contours. A first and a second clip 100a, 100b are used to removably attach the glare filter to the top side of the computer monitor.

Figure 2:
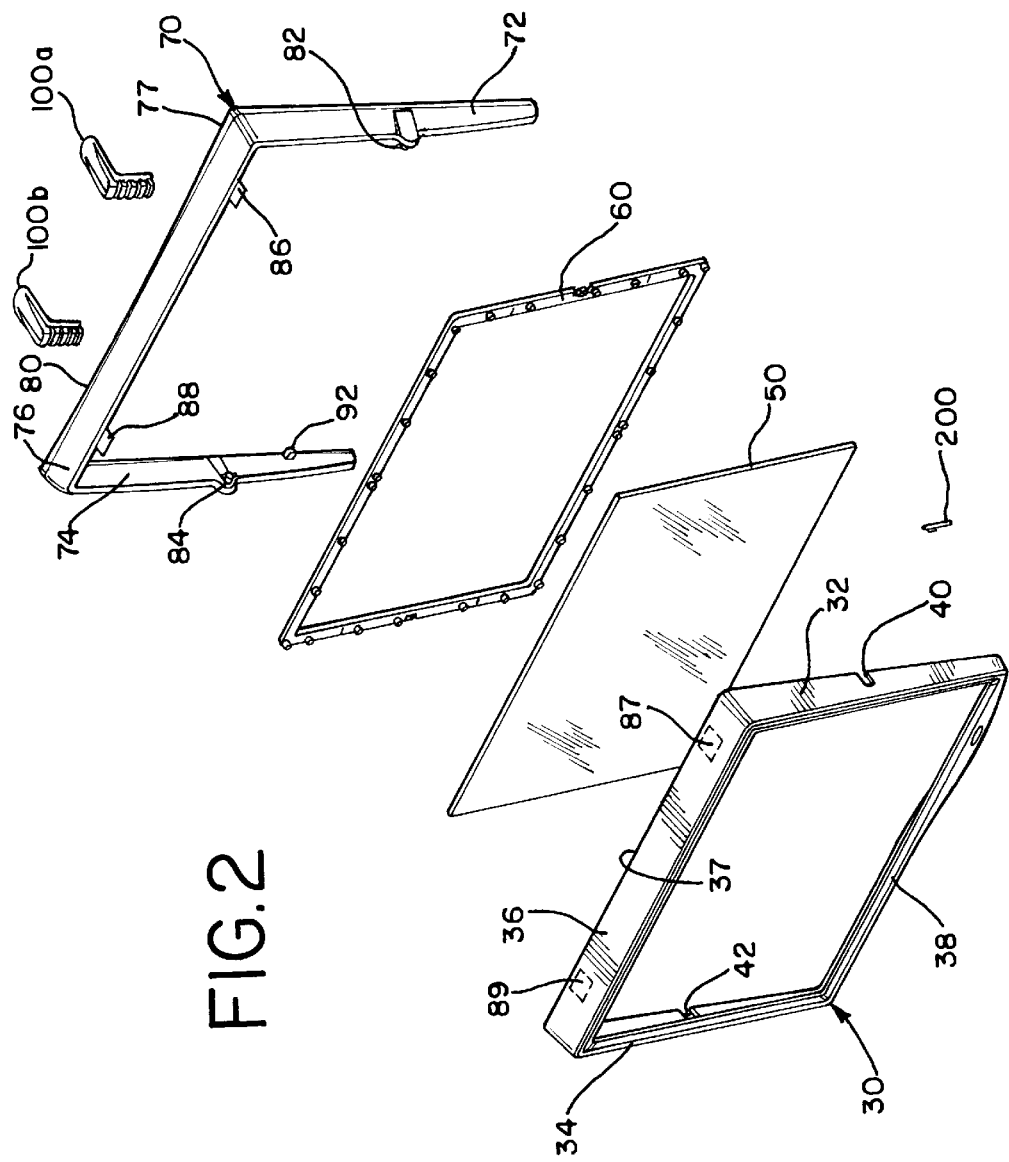
FIG. 2 is an exploded view of the glare filter of FIG. 1.

The glare filter 20 comprises a frame 30, a filter medium 50, a fastening bracket 60, and a support element 70, as best shown in FIG. 2. The frame 30 is rectangular shaped and is preferably sized to completely cover the screen of the computer monitor, although it may have any desirable shape and size. The frame 30 has a first side 32, a second side 34 spaced from and opposite the first side 32, a top side 36 having an inside surface 37, and a bottom side 38 spaced from and opposite the top side 36. When the glare filter is attached to the computer monitor, the top side 36 of the frame is located parallel with and near the distal end of the top side 12 of the computer monitor. In other words, the top side of the frame corresponds to the top side of the computer monitor.

The first side 32 of the frame 30 has a first pivot slot 40 and the second side 34 of the frame 30 has a second pivot slot 42 that is aligned with the first pivot slot. Preferably, the first and second pivot slots 40,42 are located near the middle of the first and second sides of the frame, respectively. It is conceivable, however, that the first and second pivot slots could be located closer to or at one of the ends of the first and second sides of the frame, respectively. In addition, it is also conceivable that either the first or second pivot slots, or both, may be holes instead of slots. Preferably, the frame is molded out of plastic, and thus, can be inexpensively manufactured.

As shown in FIGS. 1–2, the first and second sides of the frame are preferably tapered from one end to the other. This arrangement helps to eliminate gaps between the frame and the support element, especially when the frame is pivotably adjusted within the support element, and thus prevents glare from reaching the screen.

The filter medium 50 is also rectangular shaped, and is sized to fit within the frame 30. The filter medium 50 may be secured to the frame by a number of different means. Preferably, the filter medium 50 is secured to the frame 30 by the fastening bracket 60, although clamps, clips, molded features, and the like may also be used to secure the filter medium to the frame. The filter medium is preferably made from glass, although it may alternatively be made from plastic as well. The filter medium may have a reflective coating to reduce glare, may be colored to increase contrast, may be polarizing, or may have any other desirable characteristic as dictated by, among other things, consumer and manufacturing preferences.

The fastening bracket 60 is similarly rectangular shaped, and is sized to properly secure the filter medium 50 within the frame 30. Preferably, the fastening bracket 60 is designed to fit within the frame 30, although it is conceivable that the fastening bracket may be substantially the same or larger in size than the frame. Like the filter medium 50 and the frame 30, the fastening bracket 60 may also be made out of plastic to allow for inexpensive manufacturing.

The support element 70 has a first side 72, a second side 74, and a top side 76. The sides 72, 74, 76 of the support element 70 may be designed with a curvature that matches the curvature of most common computer monitors to eliminate light from entering the viewing area through a gap between the support element 70 and the computer monitor.

The support element 70 is preferably designed to fit around the frame 30 with its first side 72 corresponding to the first side 32 of the frame 30, its second side 74 corresponding to the second side 34 of the frame 30, and its top side 76 corresponding to the top side 36 of the frame 30. Preferably, the first and second sides 72, 74 of the support element 70 extend the entire length of the first and second sides 32, 34 of the frame 30, although the first and second sides 72, 74 of the support element 70 may be longer or shorter depending on consumer and manufacturing preferences. The first and second sides 72, 74 of the support element 70 are also preferably tapered from one end to the other in a manner corresponding to the first and second sides 32, 34 of the frame 30. Similar to the components described above, the support element 70 is preferably made out of plastic for inexpensive manufacturing purposes.

The first side 72 of the support element 70 has a first pivot post 82, and the second side 74 of the support element 70 has a second pivot post 84, that is level with the first pivot post 82. The first and second pivot posts 82, 84 are preferably located near the middle of the first and second sides of the support element, respectively. Like the first and second pivot slots 40, 42 of the frame 30 described above, it is conceivable, however, that the first and second pivot posts could be located closer to or at one of the ends of the first and second sides of the support element, respectively. The first and second pivot posts are designed to be pivotally positioned in the first and second pivot slots 40, 42 of the frame 30, respectively. This arrangement allows the frame 30 to be pivotally mounted to the support element 70.

Preferably, although not necessarily, the first side 72 of the support element 70 has a first stop 92, and the second side 74 of the support element 70 has a second stop 94 (not shown) that is a mirror image of the first stop 92. The first and second stops 92, 94 are provided to limit the pivoting range of the frame 30 within the support element 70.

The top side 76 of the support element 70 has a rib 80, a first tab 86, and a second tab 88. The rib 80 extends along an edge 77 of the top side 76, but preferably does not extend all the way to the ends of top side 76. The rib 80 is designed to be received by the first and second clips 100a, 100b. The first and second tabs 86, 88 extend outward from the opposite edge of the top side 80 and provide contact with the inside surface 37 of the top side 36 of the frame 30 when the frame 30 is positioned within the support element 70. Preferably, a first rubber pad 87 and a second rubber pad 89 are disposed on the inside surface 37 of the top side 36 of the frame 30 in alignment with, and corresponding to, the first and second tabs 86, 88, respectively. This arrangement creates slight frictional resistance between the tabs 86, 88 and the pads 87, 89 as the frame 30 is pivotally adjusted within the support. Alternatively, the first and second tabs 86, 88 may be provided with a rubber pad (not shown) to allow the inside surface 37 of the top side 36 of the frame 30 to frictionally slide along the tabs with slight resistance as the frame is being pivotally adjusted within the support element. Also, the inside surface 37 of the top side 36 of the frame 30 may have ribs (not shown) in addition to, or in place of, the rubber pads. The ribs provide interference with the tabs 86, 88, and thus, slight resistance as the frame is being pivotally adjusted within the support element.

Figure 3:
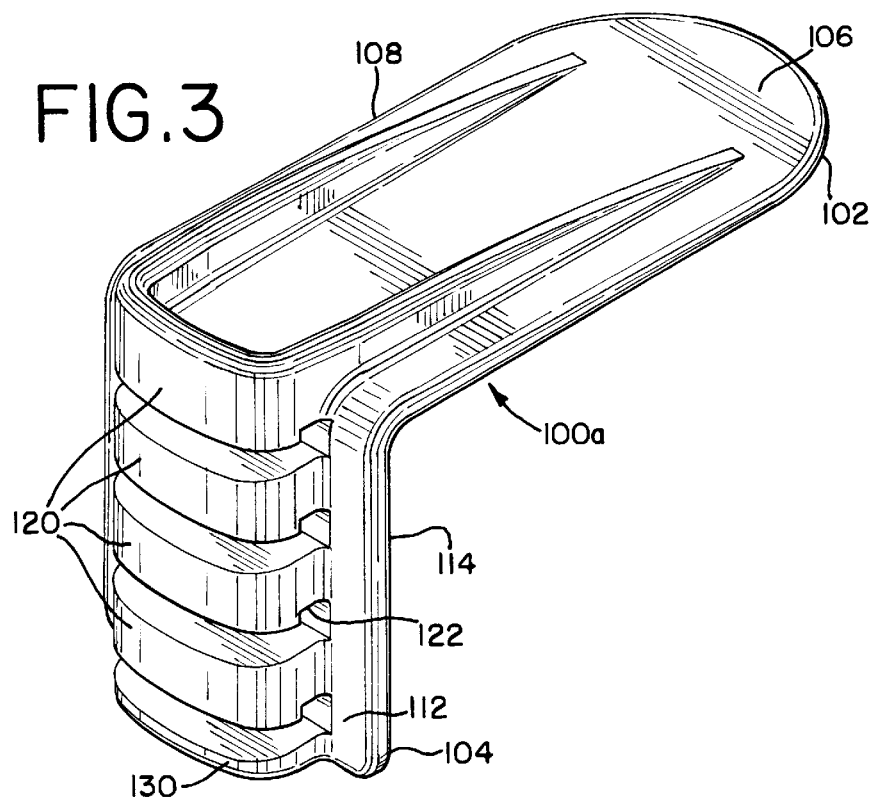
FIG. 3 is a perspective view of one of the clips shown in FIGS. 1–2.
Figure 4:
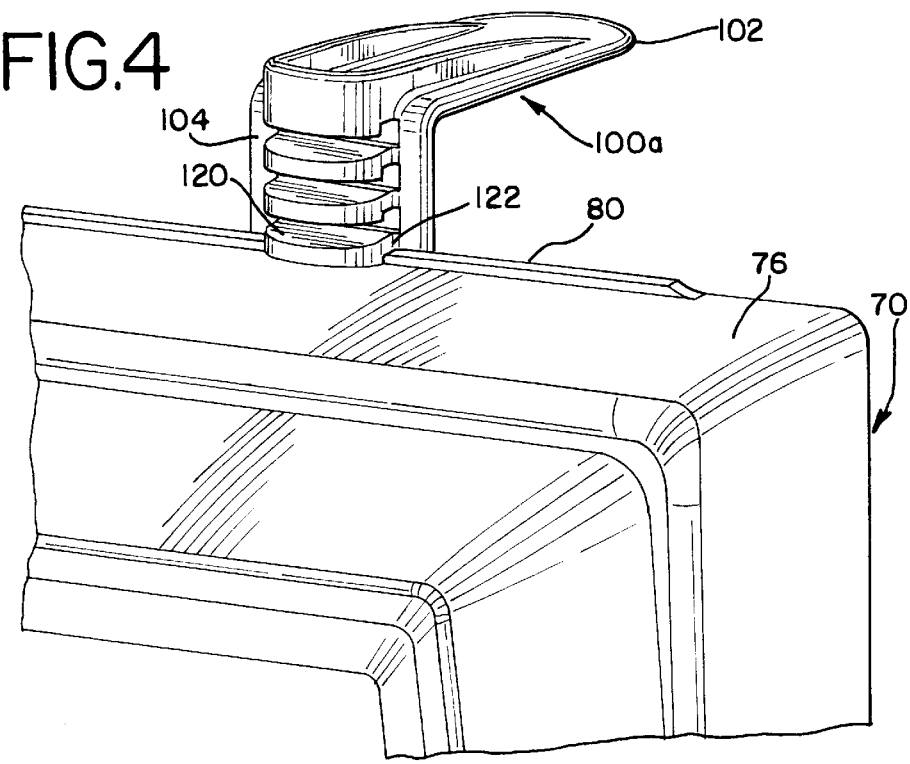
FIG. 4 is a partial perspective view of the clip of FIG. 3, the glare filter of FIGS. 1–2, and a computer monitor.

The first and second clips 100a, 100b are used to removably attach the glare filter to the top side 12 of the computer monitor. Preferably, the first clip 100a is identical to the second clip 100b, and therefore only the first clip 100a is shown in FIGS. 3–4 and described in detail below.

Each clip has an overall L-shaped configuration, with a first leg 102 and a second leg 104. The first leg 102 has a top side 106 and a bottom side 108 opposite the top side, and the second leg 104 has a top side 112 and a bottom side 114 opposite the top side 112. The bottom sides 108, 114 of the first and second legs 102, 104, face and contact the top side and front side of the computer monitor, respectively. A rubber surface may be disposed on the bottom side of the first leg or the second leg, or both, to provide a frictional seal between the clip and the computer monitor and prevent unnecessary marking of the computer monitor.

Extending outward from the top side of the second leg are a plurality of spaced-apart retainers 120. Preferably, there are four retainers as shown in FIGS. 3 and 4. The retainers are positioned one on top of the other with a space between each pair of retainers for receiving the top side 76 of the support element 70. The retainers are preferably identical, but may have different sizes to permit varying height adjustments. Each retainer has a slot 122 for receiving the rib 80 of the support element 70. Preferably, the second leg 104 also has a shelf 130 extending outward from its top side 112. The shelf 130 is positioned below and spaced from the last retainer to receive the top side 76 of the support element 70. The shelf 130 helps to support the top side 76 of the support element 70, and also helps retain the rib 80 in the slot 122 of its adjacent retainer.

Once the clips are slid onto the top side 76 of the support element and its rib 80, the glare filter may be placed on the front side of the computer monitor over the screen. The glare filter is held in place on the computer monitor by the clips. Preferably, the glare filter covers the entire screen to prevent glare from reaching any portion of the screen.

The glare filter of the present invention functions in the following manner. Each clip 100a, 100b is slid onto the top side 76 of the support element 70 and its rib 80 from one side of the top side. As a result, the top side 76 is positioned between two adjacent spaced-apart retainers and the rib 80 is positioned within one of the slots of the retainers. Depending on the desired vertical adjustment for the glare filter, the rib 80 may be positioned in any one of the slots of the clips. The retainers may also be slid along tie top side 76 and its rib 80 to any desirable horizontal position. This allows the user to position the clips anywhere along the top side of the computer monitor, preferably to a flat portion of the top side of the computer monitor.

The user may then pivotally adjust the position of the glare filter with respect to the support element 70, and thus the computer monitor. This is accomplished by pushing or pulling near the top or bottom of the frame. As a result, the frame and its filter medium may be tilted to reduce the amount of glare on the computer monitor's screen. Once the position of the frame has been set, the tabs of the top side of the support element help keep the frame from pivotably moving out of the set position by providing frictional contact with the top side of the frame. Preferably, the frame 30 of the glare filter may be pivoted within an acute angle, wherein the acute angle is between 0 and 25 degrees.

FIGS. 5, 6A and 6B show a grounding clip 200 that may be used with the glare filter of the present invention. The grounding clip 200 has a first end 202 and a second end 204 opposite the first end. The first end 202 is preferably connected to a wire 206 that is in turn connected to a grounding source (not shown).

The second end 204 of the grounding clip 200 is generally U-shaped and has a curved portion 210 and a locking portion 212. Preferably, although not necessarily, the locking portion 212 has a stepped configuration, as shown in FIG. 5. The grounding clip 200 is preferably made of a flexible conductive metal, more preferably brass, that allows the locking portion 212 to bend in a spring-like manner about the curved portion 210, as shown by the dotted lines in FIG. 5.

During assembly of the glare filter of the present invention, the second end of the grounding clip is disposed in a slot 220 located in the frame 30, as shown in FIG. 6A. As best shown in FIGS. 6A and 6B, the slot 220 has a straight portion 222 and a ledge 224. The straight portion 222 is adapted to receive the second end of the grounding clip 200 when the locking portion 212 is forced closer to the grounding clip 200.

The grounding clip is then slid further into the slot until the locking portion is past the straight portion of the slot, and thus free to expand to its unforced position. At this point, the grounding clip is fixedly positioned within the frame, and is prevented from moving out of the slot by the ledge 224 contacting the locking portion 212 of the grounding clip, as shown in FIG. 6B.

Once the grounding clip is fixedly positioned within the frame, the second end 204 of the grounding clip 200 contacts the filter medium 50 secured within the frame 30, as shown in FIG. 6B. Preferably, a conductive metal film 230 is disposed on an edge of the filter medium between the grounding clip and the edge. As a result, the grounding clip conducts static and electrical energy away from the filter medium through the conductive metal film, and passes it along the wire 206 to a grounding source (not shown).

The grounding clip of the present invention allows manufacture of the glare filter without having to position a grounding clip in place. The grounding clip may simply be inserted into the frame of the glare filter after the glare filter has been completely manufactured. This makes manufacturing the glare filter easier and reduces costs.

It should be understood that a wide range of changes and modifications can be made to the embodiments of the glare filter and grounding clip described above. For instance, the support element of the glare filter may have a bottom side in addition to the other sides, thus taking on a rectangular shape. In addition, the location of the pivot slots and the pivot posts may be reversed, with the frame having the pivot posts and the support element having the pivot slots. It is therefore intended that the foregoing description illustrates rather than limits this invention, and that it is the following claims, including all equivalents, which define this invention.

What is claimed is:

1. A glare filter for a computer monitor comprising:
   a support element having a first side, a second side, and a top side;
   a frame having a first side and a second side, the first side of the frame being pivotably connected to the first side of the support element, and the second side of the frame being pivotably connected to the second side of the support element, wherein the frame is pivotably adjustable to a plurality of tilt positions within the support element, and at each tilt position, the frame is at an acute angle with respect to the support element;
   at least one tab mounted on the support element, wherein the tab contacts the frame at each of the plurality of tilt positions; and
   a filter medium secured to the frame.

2. The glare filter of claim 1 further comprising a fastening bracket for securing the filter medium to the frame.

3. The glare filter of claim 1 further comprising a grounding dip connected to the frame and contacting the filter medium.

4. The glare filter of claim 1 further comprising at least one clip for removably attaching the support element to the computer monitor.

5. The glare filter of claim 4 wherein the at least one clip has a plurality of spaced-apart retainers for receiving the top side of the support element.

6. The glare filter of claim 4 wherein the top side of the support element has a rib, and the at least one clip has a plurality of spaced-apart retainers for receiving the top side of the support element, each retainer having a slot for slidably receiving the rib of the top side of the support element.

7. A glare filter for a computer monitor comprising:
   a support element having a first side, a second side, and a top side;
   at least one clip for removably attaching the top side of the support element to the computer monitor;
   a frame having a first side, a second side, a top side, and a bottom side, the first side of the frame being pivotably connected to the first side of the support element, and the second side of the frame being pivotably connected to the second side of the support element, wherein the frame is pivotably adjustable to a plurality of tilt positions within the support element, and at each tilt position, the frame is at an acute angle with respect to the support element;
   at least one tab mounted on the support element, wherein the tab contacts the frame at each of the plurality of tilt positions; and
   a filter medium secured to the frame.

8. The glare filter of claim 7 further comprising a fastening bracket for securing the filter medium to the frame.

9. The glare filter of claim 7 wherein the at least one clip has a plurality of spaced-apart retainers for receiving the top side of the support element.

10. The glare filter of claim 7 wherein the top side of the support element has a rib, and the at least one clip has a plurality of spaced-apart retainers for receiving the top side of the support element, each retainer having a slot for slidably receiving the rib of the top side of the support element.

11. The glare filter of claim 7 further comprising a grounding clip connected to the frame and contacting the filter medium.

12. In combination with a computer monitor having a top side, a glare filter comprising:

a support element having a first side, a second side, and a top side, the support element being removably attached to the top side of the computer monitor;

a frame having a first side, a second side, a top side, and a bottom side, the first side of the frame being pivotably connected to the first side of the support element, and the second side of the frame being pivotably connected to the second side of the support element, wherein the frame is pivotably adjustable to a plurality of tilt positions within the support element, and at each tilt position, the frame is at an acute angle with respect to the support element;

at least one tab mounted on the support element, wherein the tab contacts the frame at each of the plurality of tilt positions; and a filter medium secured to the frame.

13. The glare filter of claim 12 further comprising a fastening bracket for securing the filter medium to the frame.

14. The glare filter of claim 12 further comprising a grounding clip connected to the frame and contacting the filter medium.

15. The glare filter of claim 12 further comprising at least one clip for removably attaching the support element to the computer monitor.

16. The glare filter of claim 15 wherein the at least one clip has a plurality of spaced-apart retainers for receiving the top side of the support element.

17. The glare filter of claim 15 wherein the top side of the support element has a rib, and the at least one clip has a plurality of spaced-apart retainers for receiving the top side of the support element, each retainer having a slot for slidably receiving the rib of the top side of the support element.

* * * * *

UNITED STATES PATENT AND TRADEMARK OFFICE
CERTIFICATE OF CORRECTION

PATENT NO.    : 6,050,833
DATED         : April 18, 2000
INVENTOR(S)   : Howard L. Danzyger et al.

It is certified that error appears in the above-identified patent and that said Letters Patent is hereby corrected as shown below:

On the Title Page

In column 1, line 10, under "U.S. PATENT DOCUMENTS", delete "Hagai et al." and substitute --Nazai et al.-- in its place.

On Page 2, column 1, line 5, under "OTHER PUBLICATIONS", delete "Elek-Trek®" and substitute --Elek-Tek®-- in its place.

In the Claims

In claim 3, line 2, delete "dip" and substitute --clip-- in its place.

Signed and Sealed this

Fifteenth Day of May, 2001

Attest:

NICHOLAS P. GODICI

Attesting Officer     Acting Director of the United States Patent and Trademark Office